United States Patent
Chaudhari et al.

(10) Patent No.: US 11,043,158 B2
(45) Date of Patent: Jun. 22, 2021

(54) VIDEO BANDWIDTH OPTIMIZATION FOR MULTI-MONITOR SYSTEMS

(71) Applicant: Intel Corporation, Santa Clara, CA (US)

(72) Inventors: Prashant D. Chaudhari, Folsom, CA (US); Michael N. Derr, El Dorado Hills, CA (US); Paul Diefenbaugh, Portland, OR (US); Sameer Kalathil Perazhi, Bangalore (IN); Fong-Shek Lam, Folsom, CA (US); Arthur Jeremy Runyan, Folsom, CA (US); Jason Tanner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/863,396

(22) Filed: Jan. 5, 2018

(65) Prior Publication Data

US 2019/0043411 A1    Feb. 7, 2019

(51) Int. Cl.
| | |
|---|---|
| *G09G 3/20* | (2006.01) |
| *G06T 1/60* | (2006.01) |
| *G06F 3/14* | (2006.01) |
| *G06T 9/00* | (2006.01) |
| *H04N 19/426* | (2014.01) |

(52) U.S. Cl.
CPC ......... *G09G 3/2092* (2013.01); *G06F 3/1431* (2013.01); *G06T 1/60* (2013.01); *G06T 9/00* (2013.01); *G09G 2330/021* (2013.01); *G09G 2340/02* (2013.01); *G09G 2350/00* (2013.01); *G09G 2360/04* (2013.01); *G09G 2360/12* (2013.01); *G09G 2360/18* (2013.01); *H04N 19/426* (2014.11)

(58) Field of Classification Search
None
See application file for complete search history.

(56) References Cited

U.S. PATENT DOCUMENTS

| | | | | |
|---|---|---|---|---|
| 10,062,429 | B1 * | 8/2018 | Borole | G11C 11/4094 |
| 10,345,953 | B2 * | 7/2019 | Knepper | G06F 1/1694 |
| 2009/0302921 | A1 * | 12/2009 | Hwang | G06F 1/04 327/295 |
| 2016/0259400 | A1 * | 9/2016 | Wagh | H04W 52/0203 |
| 2016/0364198 | A1 * | 12/2016 | Song | G06F 3/1454 |
| 2017/0142447 | A1 * | 5/2017 | Toth | H04N 19/115 |
| 2017/0263206 | A1 * | 9/2017 | Bae | G09G 5/001 |
| 2019/0026243 | A1 * | 1/2019 | Modrzyk | G09G 5/00 |
| 2019/0051229 | A1 * | 2/2019 | Ozguner | G09G 3/2003 |

* cited by examiner

*Primary Examiner* — YuJang Tswei
(74) *Attorney, Agent, or Firm* — Schwegman Lundberg & Woessner, P.A.

(57) ABSTRACT

Various systems and methods for managing graphics subsystems are described herein. A system for managing graphics subsystems of a compute device includes a display controller operable to: receive an indication that a first display of the compute device has been activated; enable a power management feature in a display controller, the power management feature to reduce power consumption of the display controller and associated components, and the power management feature to reduce graphics memory bandwidth usage; receive an indication that a second display has been activated with the first display; and maintain the power management feature for at least the first display.

25 Claims, 5 Drawing Sheets

VIDEO BANDWIDTH OPTIMIZATION FOR MULTI-MONITOR SYSTEMS

TECHNICAL FIELD

Embodiments described herein generally relate to graphics controllers, and in particular, to systems and methods for video bandwidth optimization for multi-monitor systems.

BACKGROUND

Computers have become ubiquitous in modern society. As people integrate computer use into their daily work and recreational lives, use of multiple displays is becoming more common. However, computer system performance typically degrades as additional displays are connected due to the high-priority memory accesses that are needed to refresh the images being presented. Performance, which is highly-dependent on system memory bandwidth and latency, may be drastically impacted. This problem only becomes worse as display resolutions, color depths, and refresh rates increase.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Compute devices include any processor-based device. Consumer-oriented compute devices include desktop computers, autonomous vehicles, home theater systems, etc. Compute devices include the class of devices known as mobile devices. Mobile devices include laptops, tablets, mobile phones, and the like. As technology has expanded, the realm of mobile devices has increased increase to include wearable devices, such as smartwatches, smartglasses, and virtual reality (VR) headsets. Being mobile, design of these devices largely focus on efficient battery use to extend the available uptime. When operating using battery power (e.g., direct current (DC)), one or more video compression or optimization algorithms may be used to reduce video bandwidth usage, thereby conserving power.

Many compute devices and mobile devices are single-screen or single-display devices. Users may attach a second display to some of these types of mobile devices to increase their usefulness, add additional functionality, provide local viewers a concurrent display of the user's display, or the like. When adding a second display, in most cases, the mobile device is running on mains power (e.g., alternating current (AC)) to provide sufficient power to the mobile device in order to drive the second display. If the second display does not have its own power supply, for example, obtaining power from the compute device through a data and power wired connection, then the use of AC power is even more likely.

When a compute device is on AC power, then power conservation concerns are largely reduced or eliminated. As such, the mechanisms to reduce video bandwidth usage and reduce processing overhead are disabled. However, with an increase of higher display resolutions having a corresponding increase of color depth on system configuration, the use of multiple displays is incurring more memory traffic in the system. This increased traffic is causing performance degradations on CPU/GPU/IPU/other compute/IO intensive applications. Thus, the present disclosure also recognizes that while useful for power savings, mechanisms to reduce video bandwidth are also useful to provide better overall performance in multiple display use cases.

Figure 1:
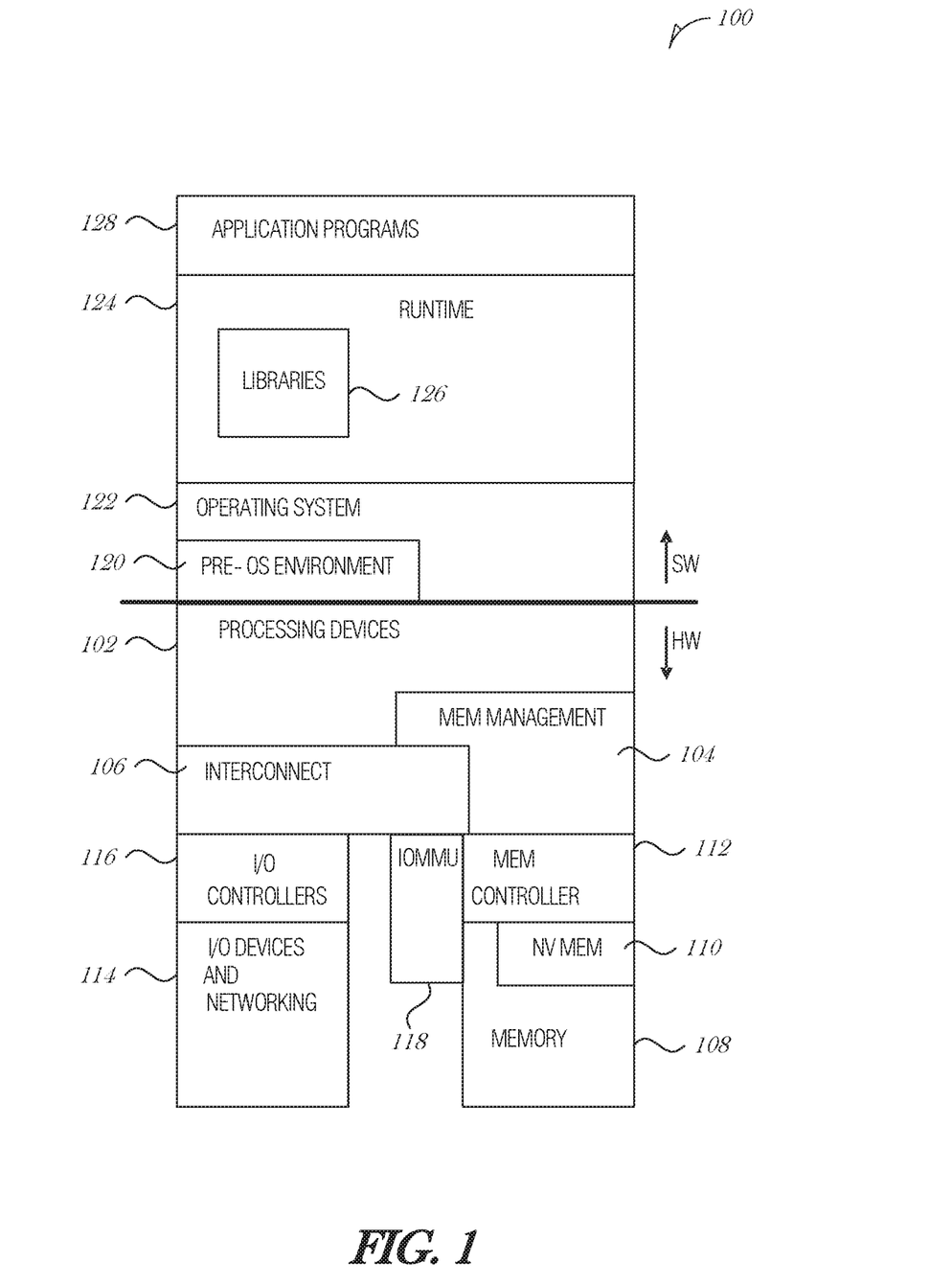
FIG. 1 is a diagram illustrating hardware and software architecture of a computer system, in which various interfaces between hardware components and software components are shown, according to an embodiment.

FIG. 1 is a diagram illustrating hardware and software architecture 100 of a computing system, in which various interfaces between hardware components and software components are shown, according to an embodiment. As indicated by HW, hardware components are represented below the divider line, whereas software components (denoted by SW) reside above the divider line. On the hardware side, processing devices 102 (which may include one or more microprocessors, digital signal processors, etc., each having one or more processor cores, are interfaced with memory management device 104 and system interconnect 106. Memory management device 104 provides mappings between virtual memory used by processes being executed, and the physical memory. Memory management device 104 may be an integral part of a central processing unit which also includes the processing devices 102.

Interconnect 106 includes a backplane such as memory, data, and control lines, as well as the interface with input/output devices, e.g., PCI, USB, etc. Memory 108 (e.g., dynamic random access memory—DRAM) and non-volatile memory 110 such as flash memory (e.g., electrically-erasable read-only memory—EEPROM, NAND Flash, NOR Flash, etc.) are interfaced with memory management device 104 and interconnect 106 via memory controller 112. This architecture microarchitecture 100 may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 114, which interface with interconnect 106 via corresponding I/O controllers 116.

In a related embodiment, input/output memory management unit IOMMU 118 supports secure direct memory access (DMA) by peripherals. IOMMU 118 may provide memory protection by meditating access to memory 108 from I/O device 114. IOMMU 118 may also provide DMA memory protection in virtualized environments, where it allows certain hardware resources to be assigned to certain guest VMs running on the system, and enforces isolation between other VMs and peripherals not assigned to them.

On the software side, a pre-operating system (pre-OS) environment 120, which is executed at initial system start-up and is responsible for initiating the boot-up of the operating system. One traditional example of pre-OS environment 120 is a system basic input/output system (BIOS). In present-day systems, a unified extensible firmware interface (UEFI) may be implemented. Pre-OS environment 120, is responsible for initiating the launching of the operating system, but also provides an execution environment for embedded applications.

Operating system (OS) 122 provides one or more kernels that control the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 122 provides device drivers, and a variety of common services such as those that facilitate interfacing with peripherals and networking, that provide abstraction for application programs so that the applications do not need to be responsible for handling the details of such common operations. Operating system 122 additionally provides a graphical user interface (GUI) that facilitates interaction with the user via peripheral devices such as a monitor, keyboard, mouse, microphone, video camera, touchscreen, and the like.

Runtime system 124 implements portions of an execution model, including such operations as putting parameters onto the stack before a function call, the behavior of disk input/output (I/O), and parallel execution-related behaviors. Runtime system 124 may also perform support services such as type checking, debugging, or code generation and optimization.

Libraries 126 include collections of program functions that provide further abstraction for application programs. These include shared libraries, dynamic linked libraries (DLLs), for example. Libraries 126 may be integral to the operating system 122, runtime system 124, or may be added-on features, or even remotely-hosted. Libraries 126 define an application program interface (API) through which a variety of function calls may be made by application programs 128 to invoke the services provided by the operating system 122. Application programs 128 are those programs that perform useful tasks for users, beyond the tasks performed by lower-level system programs that coordinate the basis operability of the computing device itself.

Figure 2:
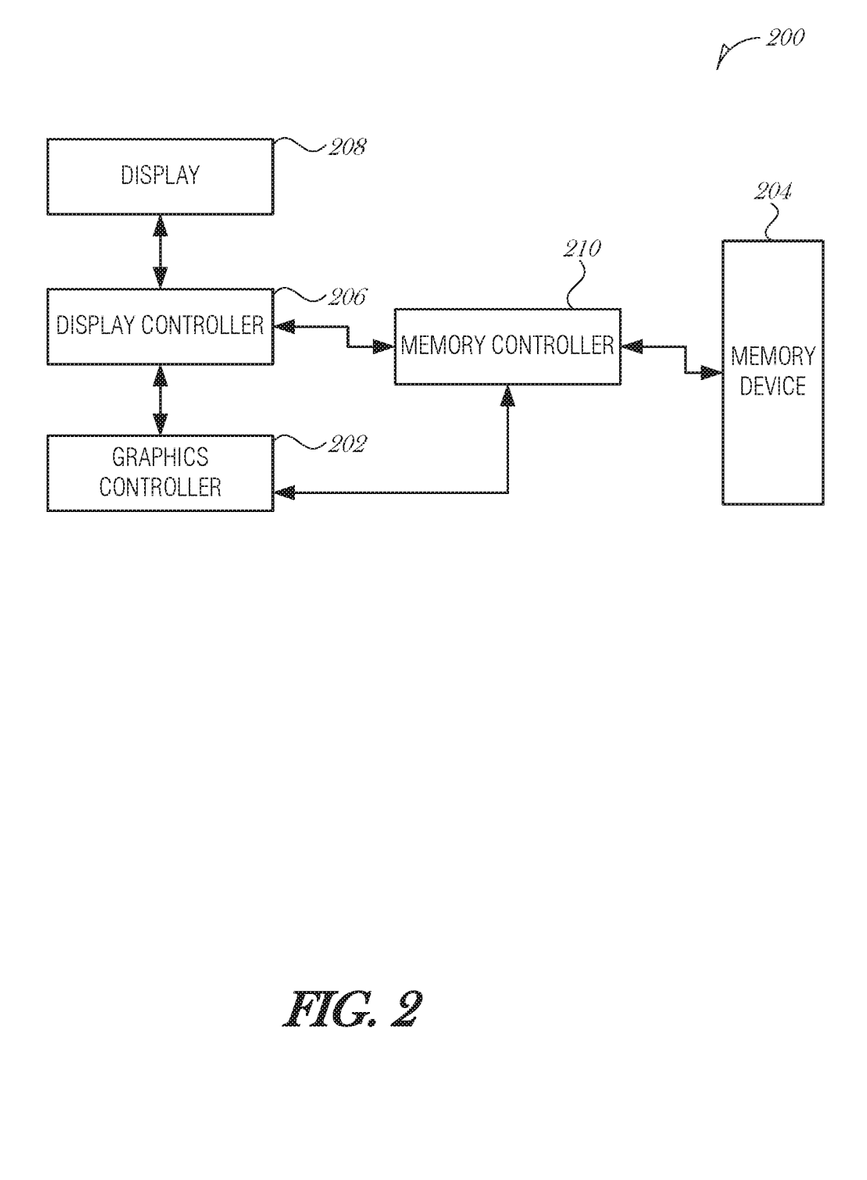
FIG. 2 is a block diagram illustrating a graphics subsystem, according to an embodiment.

FIG. 2 is a block diagram illustrating a graphics subsystem 200, according to an embodiment. The graphics subsystem 200 includes a graphics controller 202, a memory device 204, a display controller 206, a display 208, and memory controller 210. The graphics controller 202 may be an intellectual property (IP) block incorporated into a system on a chip (SoC). The graphics controller 202 may be coupled to one or more processor cores (not shown), which may be in the same package or on the same die, depending on the relevant microarchitecture.

The memory device 204 may be dedicated memory for the graphics controller 202 and may be used to buffer one or more frames for output on the display 208 via the display controller 206. The memory device 204 may be on-die memory, such as a last level cache (LLC) device. An LLC device is the highest-level cache that is typically shared by all functional units (IP blocks) on a chip, such as CPU cores, graphics controllers, etc. The memory device 204 may also represent L1, L2, or L3 cache available to the graphics controller. The memory device 204 may also represent main system memory. In general, the memory device 204 represents any memory that the graphics controller 202 uses to rasterize, shade, render, or other functions to build a frame. The frame may also be stored in the memory device 204.

The memory controller 210 is used by the display controller 206 and graphics controller 202 to access the memory device 204. The memory controller 210 may be coupled to one or more processor cores (not shown), which may be in the same package or on the same die, depending on the relevant microarchitecture.

Frame buffer compression (FBC) is a technique to store frames in a frame buffer in a compressed format. The compression and decompression may be performed by separate processing hardware, such as the display controller 206, so as to not involve the processor core or the memory system. FBC reduces power consumption of components by requiring fewer frame buffer accesses. FBC also reduces bus traffic and increases available memory bandwidth.

Panel Self Refresh (PSR) is a technique that uses memory in the display panel to refresh contents on the display. For a 60 Hz panel, instead of moving a frame from the frame buffer to the display 60 times per second, if the display content is static, then the contents of the frame buffer may be reused from the display panel's local memory. The refreshes come from the panel's memory, allowing the display pipeline and SoC to drive down to an even lower power state. In addition, during static content refreshes, there is little to no traffic on the bus.

Render compression (RC) is another compression technique that compresses the render itself after it is constructed in the frame buffer. Render compression may be used to compress textures in a lossy format so that texture decompression may be executed on-the-fly during rendering as part of the overall graphics pipeline. RC may reduce overall bandwidth and storage needs throughout the graphics subsystem 200.

In prior art systems, FBC, PSR, and RC may be used alone or in some combination to reduce power consumption. For instance, when a mobile device is running with a single display (e.g., the embedded display screen), the graphics controller 202 or display controller 206 may enable FBC, PSR, and RC. Further, in prior art systems, when a second display was attached to the mobile device, the graphics controller 202 or display controller 206 would disable these power-saving mechanisms under the assumption that there was likely an external power source (e.g., AC power) to power the mobile device and the second display, and that power savings was not as important.

In the improved systems described here, on startup the compute device will enable power savings mechanisms, such as FBC, PSR, and RC, and then when a second display is connected or detected, these mechanisms will stay active. By keeping these mechanisms active, the bandwidth efficiency gains are maintained.

In addition, reduced memory traffic on the overall SoC, and on memory modules, results in net power savings as compared to the legacy case. The saved power may be used for budgeting back towards compute-intensive logic for enhancing performance, increasing the aggregate of improvement.

Figure 3:
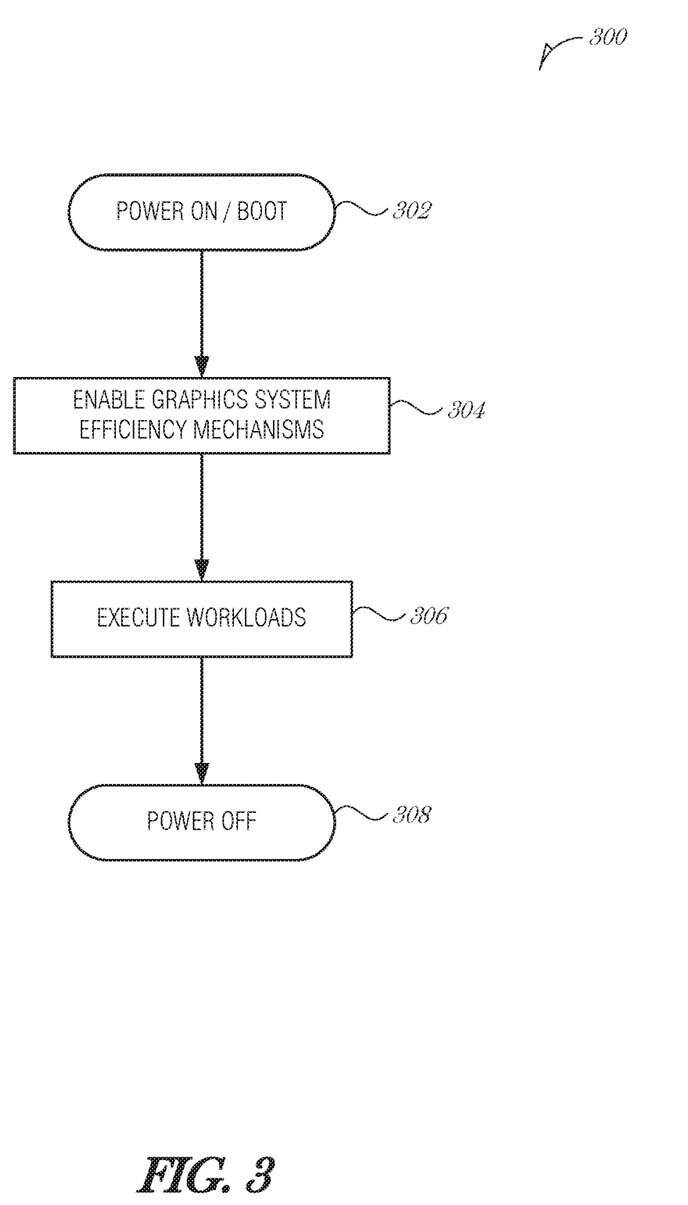
FIG. 3 is a flowchart illustrating a method for maintaining bandwidth efficiencies, according to an embodiment.

FIG. 3 is a flowchart illustrating a method 300 for maintaining bandwidth efficiencies, according to an embodiment. At 302, the system is powered on (e.g., booted). At

304, graphics system bandwidth and power-saving features are enabled. These features help to minimize the graphic system's isochronous traffic, which in turn reduces the memory bottleneck, to get the higher performance throughput of the overall graphics system. Examples of graphics system bandwidth and power-saving features includes, but are not limited to FBC, PSR, and RC. At 306, workloads are executed by the graphics system. During this phase, additional displays may be connected, disconnected, and reconnected, for example. During these configuration changes, the graphics system bandwidth and power-saving features are not disabled. At 308, the system is powered off, suspended, hibernated, or the like.

Figure 4:
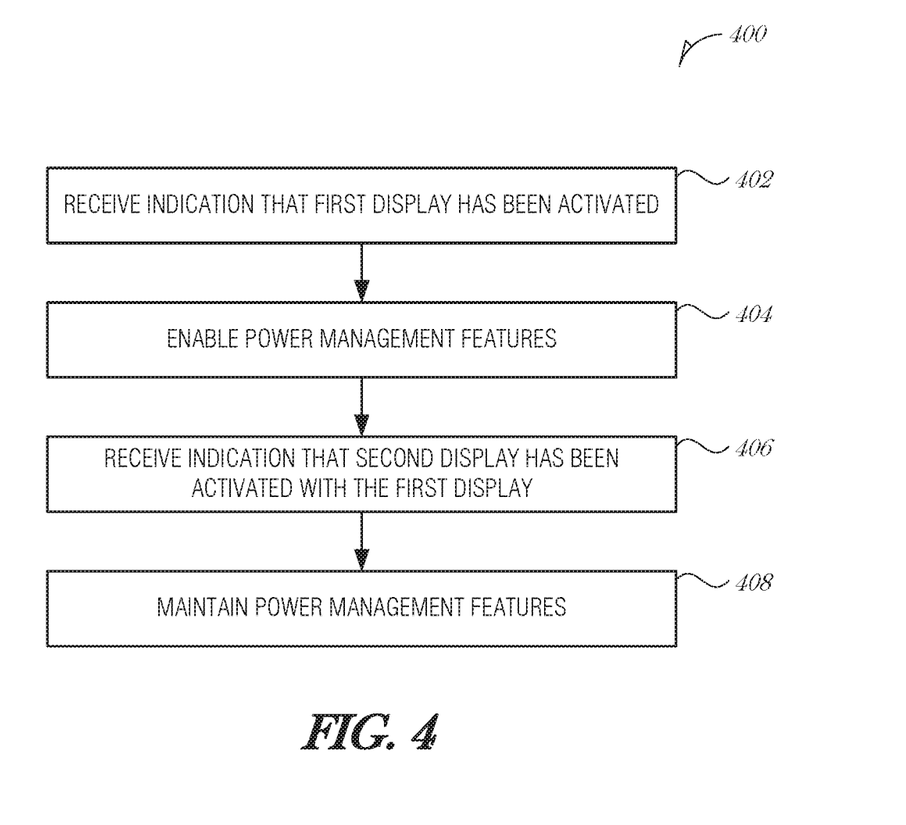
FIG. 4 is a flowchart illustrating a method for managing graphics subsystems, according to an embodiment.

FIG. 4 is a flowchart illustrating a method 400 for managing graphics subsystems, according to an embodiment. At 402, an indication is received that a first display of the compute device has been activated. The indication may be received at a compute device.

In an embodiment, the compute device is a cellular phone. In another embodiment, the compute device is a desktop computer. In another embodiment, the compute device is a laptop computer. In another embodiment, the compute device is a tablet computer. In another embodiment, the compute device is a virtual reality headset. In another embodiment, the compute device is an augmented reality headset.

In an embodiment, the first display is an embedded display. In another embodiment, the first display is an attached display, such as by using a USB-C connection, an HDMI connection, a VGA connection, a wireless connection, or the like.

At 404, a power management feature is enabled in a display controller, the power management feature to reduce power consumption of the display controller and associated components, and the power management feature to reduce graphics memory bandwidth usage.

In an embodiment, enabling the power management feature includes enabling a frame buffer compression feature. In a related embodiment, enabling the power management feature includes enabling a panel self refresh feature. In a related embodiment, enabling he power management feature includes enabling a render compression feature.

At 406, an indication is received that a second display has been activated with the first display. In an embodiment, receiving the indication that the second display includes receiving an indication of a configuration change. In a further embodiment, the configuration change is an interrupt that the second display is coupled to the compute device.

At 408, the power management feature is maintained for at least the first display. In an embodiment, maintaining the power management feature for at least the first display includes maintaining a frame buffer compression feature for the first display, maintaining a panel self refresh feature for the first display, and maintaining a render compression feature for the first display and the second display.

It is understood that any number of additional display's may be attached. The power management features are maintained for the first display. In addition, in some implementations there may be more than one "first display". For instance, there may he two embedded displays in a shared housing (e.g., a laptop with two displays). Each embedded display may have power management features that are enabled and maintained in the case where an external "secondary display" is attached.

Embodiments may be implemented in one or a combination of hardware, firmware, and software. Embodiments may also be implemented as instructions stored on a machine-readable storage device, which may he read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual. instruction processing cores, state machine circuitry, and/or firmware that stores instructions executed by programmable circuitry. The circuits, circuitry, or modules may, collectively or individually, he embodied as circuitry that forms part of a larger system, for example, an integrated circuit (IC), system on-chip (SoC), desktop computers, laptop computers, tablet computers, servers, smart phones, discrete add on cards to another computing system, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

Figure 5:
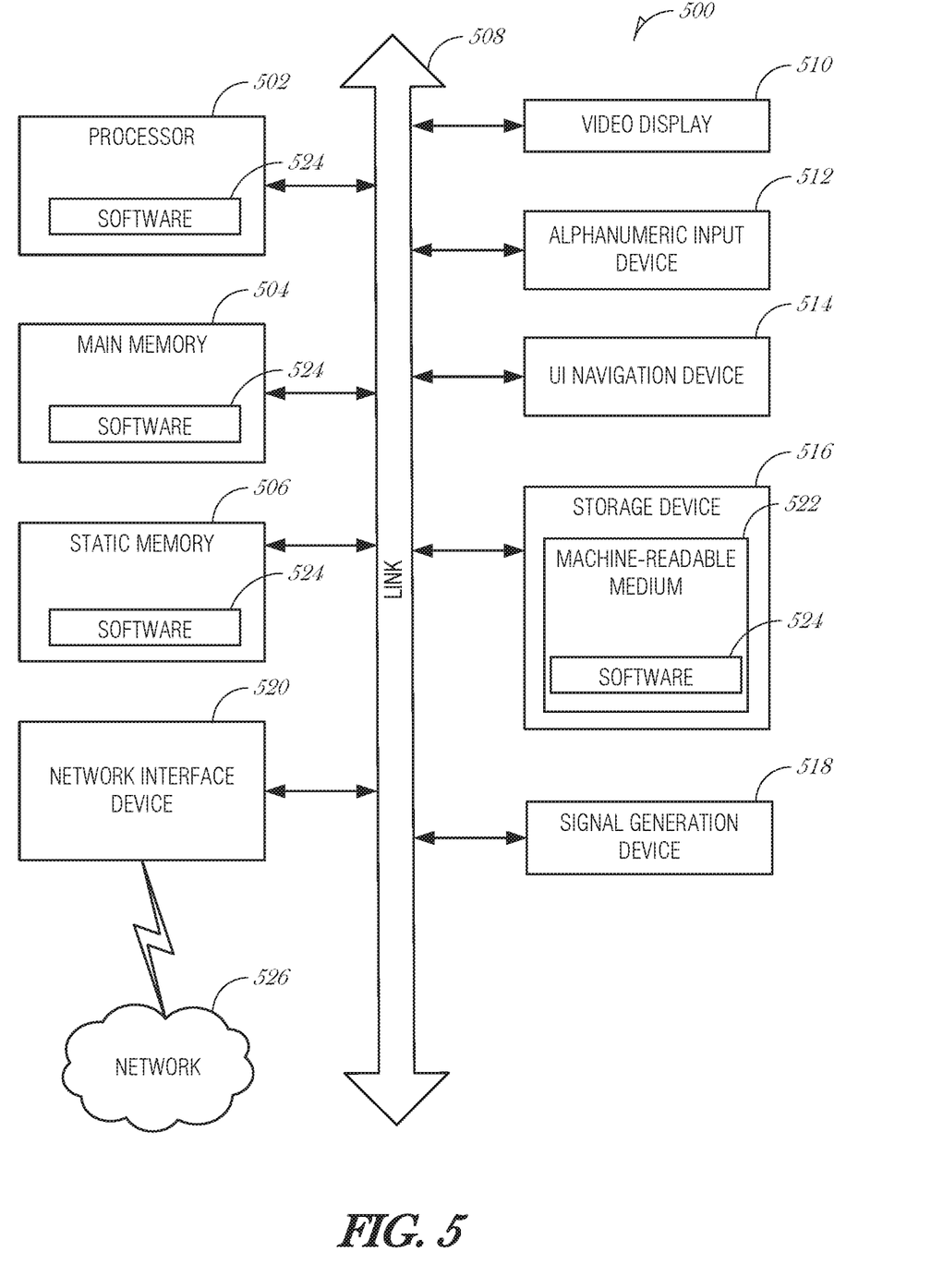
FIG. 5 is a block diagram illustrating an example machine upon which any one or more of the techniques (e.g., methodologies) discussed herein may perform, according to an embodiment.

FIG. 5 is a block diagram illustrating a machine in the example form of a computer system 500, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, gyrometer, magnetometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a system for managing graphics subsystems of a compute device, the system comprising: a display controller operable to: receive an indication that a first display of the compute device has been activated; enable a power management feature in a display controller, the power management feature to reduce power consumption of the display controller and associated components, and the power management feature to reduce graphics memory bandwidth usage; receive an indication that a second display has been activated with the first display; and maintain the power management feature for at least the first display.

In Example 2, the subject matter of Example 1 includes, wherein the compute device is a cellular phone.

In Example 3, the subject matter of Examples 1-2 includes, wherein the compute device is a desktop computer.

In Example 4, the subject matter of Examples 1-3 includes, wherein the compute device is a laptop computer.

In Example 5, the subject matter of Examples 1-4 includes, wherein the compute device is a tablet computer.

In Example 6, the subject matter of Examples 1-5 includes, wherein the compute device is a virtual reality headset.

In Example 7, the subject matter of Examples 1-6 includes, wherein the compute device is an augmented reality headset.

In Example 8, the subject matter of Examples 1-7 includes, wherein the first display is an embedded display.

In Example 9, the subject matter of Examples 1-8 includes, wherein to enable the power management feature, the display controller is to enable a frame buffer compression feature.

In Example 10, the subject matter of Examples 1-9 includes, wherein to enable the power management feature, the display controller is to enable a panel self refresh feature.

In Example 11, the subject matter of Examples 1-10 includes, wherein to enable the power management feature, the display controller is to enable a render compression feature.

In Example 12, the subject matter of Examples 1-11 includes, wherein to receive the indication that the second display, the display controller is to receive an indication of a configuration change.

In Example 13, the subject matter of Example 12 includes, wherein the configuration change comprises an interrupt that the second display is coupled to the compute device.

In Example 14, the subject matter of Examples 1-13 includes, wherein to maintain the power management feature for at least the first display, the display controller is to: maintain a frame buffer compression feature for the first display; maintain a panel self refresh feature for the first display; and maintain a render compression feature for the first display and the second display.

Example 15 is a method of managing graphics subsystems, the method comprising: receiving, at a compute device, an indication that a first display of the compute device has been activated; enabling a power management feature in a display controller, the power management feature to reduce power consumption of the display controller and associated components, and the power management feature to reduce graphics memory bandwidth usage; receiving an indication that a second display has been activated with the first display; and maintaining the power management feature for at least the first display.

In Example 16, the subject matter of Example 15 includes, wherein the compute device is a cellular phone.

In Example 17, the subject matter of Examples 15-16 includes, wherein the compute device is a desktop computer.

In Example 18, the subject matter of Examples 15-17 includes, wherein the compute device is a laptop computer.

In Example 19, the subject matter of Examples 15-18 includes, wherein the compute device is a tablet computer.

In Example 20, the subject matter of Examples 15-19 includes, wherein the compute device is a virtual reality headset.

In Example 21, the subject matter of Examples 15-20 includes, wherein the compute device is an augmented reality headset.

In Example 22, the subject matter of Examples 15-21 includes, wherein the first display is an embedded display.

In Example 23, the subject matter of Examples 15-22 includes, wherein enabling the power management feature comprises enabling a frame buffer compression feature.

In Example 24, the subject matter of Examples 15-23 includes, wherein enabling the power management feature comprises enabling a panel self refresh feature.

In Example 25, the subject matter of Examples 15-24 includes, wherein enabling the power management feature comprises enabling a render compression feature.

In Example 26, the subject matter of Examples 15-25 includes, wherein receiving the indication that the second display comprises receiving an indication of a configuration change.

In Example 27, the subject matter of Example 26 includes, wherein the configuration change comprises an interrupt that the second display is coupled to the compute device.

In Example 28, the subject matter of Examples 15-27 includes, wherein maintaining the power management feature for at least the first display comprises: maintaining a frame buffer compression feature for the first display; maintaining a panel self refresh feature for the first display; and maintaining a render compression feature for the first display and the second display.

Example 29 is at least one machine-readable medium including instructions, which when executed by a machine, cause the machine to perform operations of any of the methods of Examples 15-28.

Example 30 is an apparatus comprising means for performing any of the methods of Examples 15-28.

Example 31 is an apparatus for managing graphics subsystems, the apparatus comprising: means for receiving, at a compute device, an indication that a first display of the compute device has been activated; means for enabling a power management feature in a display controller, the power management feature to reduce power consumption of the display controller and associated components, and the power management feature to reduce graphics memory bandwidth usage; means for receiving an indication that a second display has been activated with the first display; and means for maintaining the power management feature for at least the first display.

In Example 32, the subject matter of Example 31 includes, wherein the compute device is a cellular phone.

In Example 33, the subject matter of Examples 31-32 includes, wherein the compute device is a desktop computer.

In Example 34, the subject matter of Examples 31-33 includes, wherein the compute device is a laptop computer.

In Example 35, the subject matter of Examples 31-34 includes, wherein the compute device is a tablet computer.

In Example 36, the subject matter of Examples 31-35 includes, wherein the compute device is a virtual reality headset.

In Example 37, the subject matter of Examples 31-36 includes, wherein the compute device is an augmented reality headset.

In Example 38, the subject matter of Examples 31-37 includes, wherein the first display is an embedded display.

In Example 39, the subject matter of Examples 31-38 includes, wherein the means for enabling the power management feature comprise means for enabling a frame buffer compression feature.

In Example 40, the subject matter of Examples 31-39 includes, wherein the means for enabling the power management feature comprise means for enabling a panel self refresh feature.

In Example 41, the subject matter of Examples 31-40 includes, wherein the means for enabling the power management feature comprise means for enabling a render compression feature.

In Example 42, the subject matter of Examples 31-41 includes, wherein the means for receiving the indication that the second display comprise means for receiving an indication of a configuration change.

In Example 43, the subject matter of Example 42 includes, wherein the configuration change comprises an interrupt that the second display is coupled to the compute device.

In Example 44, the subject matter of Examples 31-43 includes, wherein the means for maintaining the power management feature for at least the first display comprise: means for maintaining a frame buffer compression feature for the first display; means for maintaining a panel self refresh feature for the first display; and means for maintaining a render compression feature for the first display and the second display.

Example 45 is at least one machine-readable medium including instructions for managing graphics subsystems, the instructions when executed by a machine, cause the machine to perform operations comprising: receiving, at a compute device, an indication that a first display of the compute device has been activated; enabling a power management feature in a display controller, the power management feature to reduce power consumption of the display controller and associated components, and the power management feature to reduce graphics memory bandwidth usage; receiving an indication that a second display has been activated with the first display; and maintaining the power management feature for at least the first display.

In Example 46, the subject matter of Example 45 includes, wherein the compute device is a cellular phone.

In Example 47, the subject matter of Examples 45-46 includes, wherein the compute device is a desktop computer.

In Example 48, the subject matter of Examples 45-47 includes, wherein the compute device is a laptop computer.

In Example 49, the subject matter of Examples 45-48 includes, wherein the compute device is a tablet computer.

In Example 50, the subject matter of Examples 45-49 includes, wherein the compute device is a virtual reality headset.

In Example 51, the subject matter of Examples 45-50 includes, wherein the compute device is an augmented reality headset.

In Example 52, the subject matter of Examples 45-51 includes, wherein the first display is an embedded display.

In Example 53, the subject matter of Examples 45-52 includes, wherein enabling the power management feature comprises enabling a frame buffer compression feature.

In Example 54, the subject matter of Examples 45-53 includes, wherein enabling the power management feature comprises enabling a panel self refresh feature.

In Example 55, the subject matter of Examples 45-54 includes, wherein enabling the power management feature comprises enabling a render compression feature.

In Example 56, the subject matter of Examples 45-55 includes, wherein receiving the indication that the second display comprises receiving an indication of a configuration change.

In Example 57, the subject matter of Example 56 includes, wherein the configuration change comprises an interrupt that the second display is coupled to the compute device.

In Example 58, the subject matter of Examples 45-57 includes, wherein maintaining the power management feature for at least the first display comprises: maintaining a frame buffer compression feature for the first display; maintaining a panel self refresh feature for the first display; and maintaining a render compression feature for the first display and the second display.

Example 59 is at least one machine-readable medium including instructions that, when executed by a processor subsystem, cause the processor subsystem to perform operations to implement of any of Examples 1-58.

Example 60 is an apparatus comprising means to implement of any of Examples 1-58.

Example 61 is a system to implement of any of Examples 1-58.

Example 62 is a method to implement of any of Examples 1-58.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above, description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A. system. for managing graphics subsystems of a compute device, the system comprising:
a display controller operable to:
receive an indication that a first display of the compute device has been activated;
enable panel self refresh or render compression in the display controller, to reduce power consumption of the display controller and associated components;
receive an indication that a second display has been activated with the first display; and
maintain the panel self refresh or render compression for at least the first display while both of the first and second displays remain active and in use displaying contents, wherein the first display is running on mains power.

2. The system of claim 1, wherein the compute device is a cellular phone.

3. The system of claim 1, wherein the compute device is a desktop computer.

4. The system of claim 1, wherein the compute device is a laptop computer.

5. The system of claim 1, wherein the compute device is a tablet computer.

6. The system of claim 1, wherein the compute device is a virtual reality headset.

7. The system of claim 1, wherein the compute device is an augmented reality headset.

8. The system of claim 1, wherein the first display is an embedded display.

9. The system of claim 1, wherein to enable the power management feature, the display controller is to enable a frame buffer compression feature.

10. The system of claim 1, wherein to enable the power management feature, the display controller is to enable a panel self refresh feature.

11. The system of claim 1, wherein to enable the power management feature, the display controller is to enable a render compression feature.

12. The system of claim 1, wherein to receive the indication that the second display, the display controller is to receive an indication of a configuration change.

13. The system of claim 12, wherein the configuration change comprises an interrupt that the second display is coupled to the compute device.

14. The system of claim 1, wherein to maintain the power management feature for at least the first display, the display controller is to:
maintain a frame buffer compression feature for the first display;
maintain a panel self refresh feature for the first display; and
maintain a render compression feature for the first display and the second display.

15. A method of managing graphics subsystems, the method comprising:
receiving, at a compute device, an indication that a first display of the compute device has been activated;
enabling panel self refresh or render compression in the display controller, to reduce power consumption of the display controller and associated components;
receiving, at the compute device, an indication that a second display has been activated with the first display; and
maintaining the panel self refresh or render compression for at least the first display while the both of first and second displays remain active and in use displaying contents, wherein the first display is running on mains power.

16. The method of claim 15, wherein the first display is an embedded display.

17. The method of claim 15, wherein enabling the power management feature comprises enabling a frame buffer compression feature.

18. The method of claim 15, wherein enabling the power management feature comprises enabling a panel self refresh feature.

19. The method of claim 15, wherein enabling the power management feature comprises enabling a render compression feature.

20. The method of claim 15, wherein receiving the indication that the second display comprises receiving an indication of a configuration change.

21. The method of claim 20, wherein the configuration change comprises an interrupt that the second display is coupled to the compute device.

22. The method of claim 15, wherein maintaining the power management feature for at least the first display comprises:
maintaining a frame buffer compression feature for the first display;
maintaining a panel self refresh feature for the first display; and
maintaining a render compression feature for the first display and the second display.

23. At least one non-transitory machine-readable medium including instructions for managing graphics subsystems, the instructions when executed by a machine, cause the machine to perform operations comprising:
receiving, at a compute device, an indication that a first display of the compute device has been activated;
enabling panel self refresh or render compression in the display controller, to reduce power consumption of the display controller and associated components;
receiving, at the compute device, an indication that a second display has been activated with the first display; and
maintaining the panel self refresh or render compression for at least the first display while both of the first and second displays remain active and in use displaying contents, wherein the first display is running on mains power.

24. The non-transitory machine--readable medium of claim 23, wherein the first display is an embedded display.

25. The non-transitory machine-readable medium of claim 23, wherein enabling the power management feature comprises enabling a frame buffer compression feature.

* * * * *